(12) United States Patent
Sato

(10) Patent No.: US 8,155,216 B2
(45) Date of Patent: Apr. 10, 2012

(54) RECEIVING CIRCUIT AND RECEIVING METHOD

(75) Inventor: Takahiro Sato, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 720 days.

(21) Appl. No.: 11/727,546

(22) Filed: Mar. 27, 2007

(65) Prior Publication Data

US 2007/0230602 A1   Oct. 4, 2007

(30) Foreign Application Priority Data

Mar. 30, 2006   (JP) .................................. 2006-092844

(51) Int. Cl.
    *H04K 1/10*   (2006.01)
    *H04L 27/28*   (2006.01)

(52) U.S. Cl. .......... 375/260; 375/132; 375/226; 342/116

(58) Field of Classification Search ................... 375/132, 375/260; 342/116
    See application file for complete search history.

(56) References Cited

U.S. PATENT DOCUMENTS

| | | | | |
|---|---|---|---|---|
| 6,944,122 | B2 * | 9/2005 | Shirakata et al. | 370/208 |
| 7,397,758 | B1 * | 7/2008 | Hart et al. | 370/208 |
| 7,535,819 | B1 * | 5/2009 | Larsson et al. | 370/208 |
| 7,539,255 | B2 * | 5/2009 | Redfern | 375/260 |
| 7,724,804 | B2 | 5/2010 | Yamasuge | |
| 2003/0026371 | A1 * | 2/2003 | Laroia et al. | 375/362 |
| 2003/0215021 | A1 * | 11/2003 | Simmonds | 375/260 |
| 2004/0151109 | A1 * | 8/2004 | Batra et al. | 370/208 |
| 2004/0161047 | A1 * | 8/2004 | Liu et al. | 375/260 |
| 2004/0184551 | A1 * | 9/2004 | Liu et al. | 375/260 |
| 2005/0111492 | A1 * | 5/2005 | Kang et al. | 370/480 |
| 2005/0207351 | A1 * | 9/2005 | Inagawa | 370/252 |
| 2005/0286649 | A1 * | 12/2005 | Redfern | 375/260 |
| 2007/0067704 | A1 * | 3/2007 | Altintas et al. | 714/795 |
| 2007/0147479 | A1 | 6/2007 | Yamasuge | |

FOREIGN PATENT DOCUMENTS

JP   2007142602   6/2007

OTHER PUBLICATIONS

Anuj Batra et al., "Multi-Bank OFDM Physical Layer Proposal for IEEE 802.15 Task", IEEE P802.15-03/268r1, Sep. 2003, IEEE P802.15 Wireless Personal Area Networks.
A Batra, Project: IEEE P802.15 Working Group for Wireless Personal Area Networks (WPANS), Doc: IEEE 802.15-03/267 r6.
JP Office Action dated Jun. 7, 2011.

* cited by examiner

*Primary Examiner* — Shuwang Liu
*Assistant Examiner* — Sung Ahn
(74) *Attorney, Agent, or Firm* — Young & Thompson

(57) ABSTRACT

A receiving circuit which receives information using a multi-carrier signal comprises a phase rotation amount calculator which calculates a first and a second phase rotation amount of a multi-carrier signal included in a first and a second frequency band according to a pilot-sub carrier included in the first and the second frequency band, a phase storage which stores the first and second phase rotation amount and a phase rotation amount determination unit which calculates a correction amount based on the first phase rotation amount stored in the phase storage and an input multi-carrier signal when the input multi carrier signal is included in the first frequency band, and calculates a correction amount based on the second phase rotation amount stored in the phase storage and an input multi-carrier signal when the input multi-carrier signal is included in the second frequency band.

1 Claim, 10 Drawing Sheets

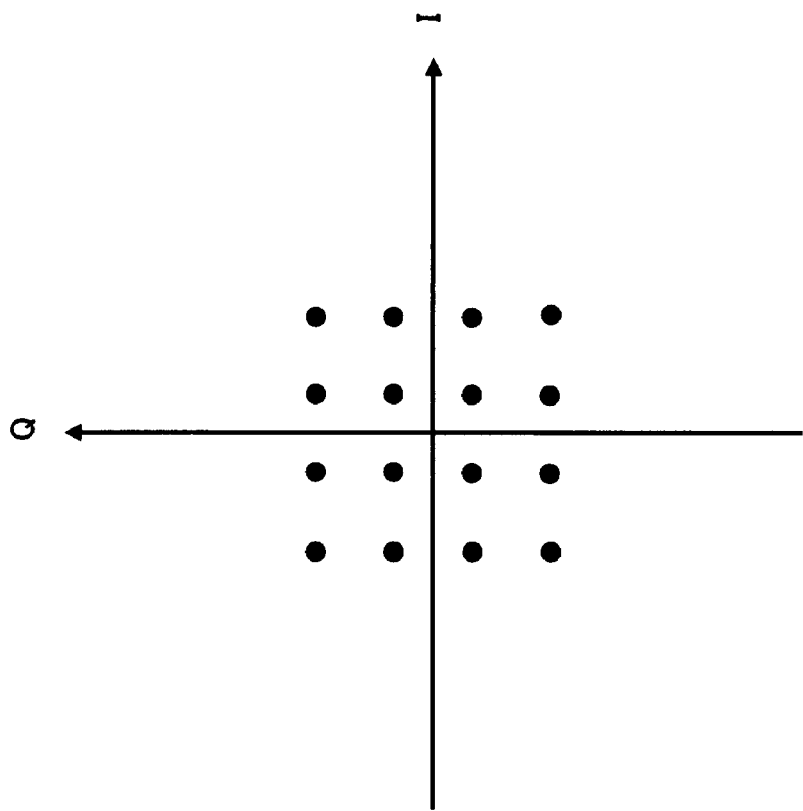
Fig. 2B  16QAM
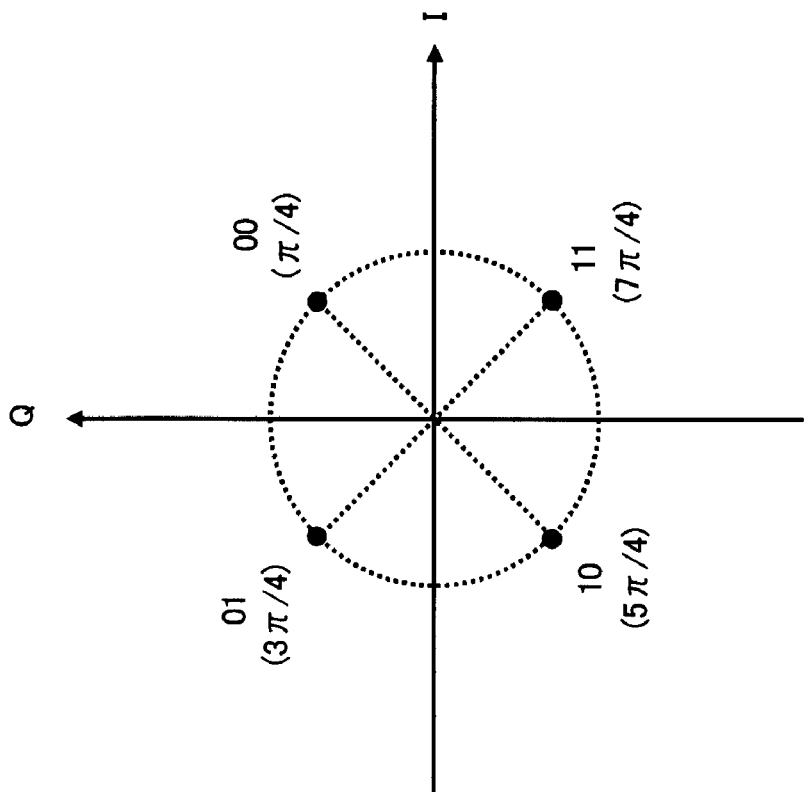
Fig. 2A  QPSK $$Z_a = (x_a, y_a) = r_a \cdot (\cos\theta_a + j \cdot \sin\theta_a)$$

$$Z_b = (x_b, y_b) = r_b \cdot (\cos\theta_b + j \cdot \sin\theta_b)$$

RECEIVING CIRCUIT AND RECEIVING METHOD

BACKGROUND OF THE INVENTION

1. Field of the Invention

The present invention relates to a receiving circuit and a receiving method for receiving a multi-carrier signal in a radio communication system, and particularly, a receiving circuit and a receiving method for receiving a radio signal multiplexed by a multi-band Orthogonal Frequency Division Multiplexing (OFDM).

2. Description of the Related Art

Ultra Wide Band (UWB) communication is proposed as close range and large volumetric radio communication recently. Especially, a proposal of a UWB system for Multi-Band Orthogonal Frequency Division Multiplexing (MB-OFDM) is coming under the spotlight. MB-OFDM is discussed under TG3a of IEEE 802.15 committee in order to standardize. Details of MB-OFDM are described in IEEE P802.15-03/268r1 and IEEE P802.15-03/267r6.

A basic technique about OFDM and MB-OFDM is described below. OFDM is a communication method which is called a multi-carrier communication method. A multi-carrier communication method transmits data using a plurality of carriers. OFDM transmits and receives a plurality of bits using a plurality of carriers. A plurality of carriers are called sub-carriers in OFDM. Center frequencies of any two carriers, which are adjacent with each other, are orthogonal in sub-carriers, and a single frequency band of OFDM is occupied with a plurality of sub-carriers.

In a normal OFDM system, each sub-carrier is modulated by using multi-value Quadrature Amplitude Modulation (QAM), so that one sub-carrier can transmits a plurality of bits. Therefore, in case that m sub-carriers are used in OFDM communication and each sub-carrier can transmit n bits, m*n bits of data are transmitted at once. In OFDM, data transmitted at once is called one symbol.

Modulation and demodulation in OFDM are described below. FIG. 9 shows a transmitting apparatus and a receiving apparatus which modulate or demodulate data in OFDM system. In OFDM modulation, serial data for transmission is supplied to transmitting apparatus. A serial-parallel converter 901 of the transmitting apparatus converts serial data to parallel data. This serial-parallel conversion is carried out because OFDM uses a plurality of carriers at once.

Then, sub-carrier modulators 902 modulate sub-carriers as described above. Multi-value QAM shows a plurality of bits using amplitude and phase. Data of multi-value QAM is shown in complex number plane.

Sub-carrier modulated signals are inverse discrete Fourier transformed. This transform is performed in each sub-carrier frequency. Signals, which are inverse discrete Fourier transformed and synthesized by inverse discrete Fourier transformer (IFFT) 903, are transmitted as an OFDM signal (multi-carrier signals) via D/A converter 904 and antenna. More processes are performed in order to transmit an OFDM signal, however, these processes are omitted here.

In demodulation of a modulated signal, an inversed operation described above is performed. In a receiving apparatus, received signals are detected and an OFDM signal is taken out. An OFDM signal is converted to a digital signal by an A/D converter 905. Fourier transformer (FFT) 906 discrete Fourier transforms a digital signal and separates a signal to a plurality of sub-carrier signals. Then, sub-carrier demodulators 907 demodulate sub-carrier signals. A parallel-serial converter 908 converts sub-carrier signals to serial data, and received data is output.

In OFDM method, in order to accurately demodulate a sub-carrier modulated signal, noises that are introduced in transmission path have to be removed by signal processing. In signal processing, a phase rotation amount of a received symbol has to be obtained in order to adjust and remove a phase noise due to fluctuation of a local frequency of a transmitting apparatus and a receiving apparatus. Therefore, several sub-carriers are set as pilot-sub-carriers in OFDM. Pilot-sub-carriers are predetermined sub-carriers, and pilot-sub carriers do not have data. In a receiving apparatus, a phase rotation amount is calculated based on pilot-sub-carriers.

MB-OFDM included in OFDM varies a frequency band occupied by a symbol. For example, assuming that center frequencies of frequency bands occupied by a plurality of sub-carriers correspond to f0, f1 and f2, MB-OFDM changes a center frequency of a frequency band by every symbol, such as f0 to f1, f1 to f2 and f2 to f0. This operation is called frequency hopping. FIG. 10 shows transmitted symbols with frequency hopping. FIG. 10 shows an example of transmitted data D1 to D7 with frequency band hopping, such as BAND1 to BAND2 and BAND2 to BAND3.

In case that a symbol is received in an OFDM system, a phase rotation amount of the received symbol has to be calculated in order to accurately reproduce received information. A phase rotation amount is calculated using pilot-sub-carriers interposed in data sub-carriers. Phase rotation amounts of pilot-sub-carriers cannot use directly to adjust a symbol because of unexpected noise or fading. Therefore, in single band OFDM without frequency hopping, calculated phase rotation amounts are smoothed among a plurality of OFDM symbols. Smoothed phase rotation amount is used in order to adjust a received symbol. In this specification, "smoothing phase rotation amounts" means calculated phase amounts are smoothed among a plurality of OFDM symbols.

On the other hands, MB-OFDM performs frequency hopping by every symbol. Therefore, a frequency band of the latest OFDM symbol is different from that of OFDM symbol received before.

Therefore, a receiving circuit and a receiving method that can calculate a phase rotation amount and perform phase tracking are required in MB-OFDM. Therefore, in Japanese Patent Application No. 2006-91158, the inventor of the present invention suggested a receiving circuit which calculates a phase rotation amount in MB-OFDM.

A receiving circuit and a receiving method that can calculate a phase rotation amount and perform phase tracking are required in MB-OFDM. In the above described Japanese Patent Application, a receiving circuit calculates a phase rotation amount of a frequency band is calculated based on a phase rotation amount of another frequency band. Thereby, if noises such as jamming are introduced in a certain frequency band, a phase rotation amount of a frequency band is changed because the phase rotation amount is calculated based on the phase rotation amount of the certain band. Therefore, there is a case that a calculated phase rotation amount is not accurate.

SUMMARY OF THE INVENTION

A receiving circuit which receives information using a multi-carrier signal comprises a phase rotation amount calculator which calculates a first and a second phase rotation amount of a multi-carrier signal included in a first and a second frequency band according to a pilot-sub carrier included in the first and the second frequency band, a phase storage which stores the first and second phase rotation amount and a phase rotation amount determination unit which calculates a correction amount based on the first phase rotation amount stored in the phase storage and an input multi-carrier signal when the input multi carrier signal is included in the first frequency band, and calculates a correction amount based on the second phase rotation amount stored in the phase storage and an input multi-carrier signal when the input multi-carrier signal is included in the second frequency band.

A receiving method which receives information using a multi-carrier signal comprises calculating a first and a second phase rotation amount of a multi-carrier signal included in a first and a second frequency band according to a pilot-sub carrier included in the first and the second frequency band, storing the first and second phase rotation amount, calculating a correction amount based on the first phase rotation amount stored in the phase storage and an input multi-carrier signal when the input multi carrier signal is included in the first frequency band and calculating a correction amount based on the second phase rotation amount stored in the phase storage and an input multi-carrier signal when the input multi-carrier signal is included in the second frequency band.

BRIEF DESCRIPTION OF THE DRAWINGS

The above and other objects, advantages and features of the present invention will be more apparent from the following description taken in conjunction with the accompanying drawings, in which:

FIG. 2A shows QPSK in a complex plane;

FIG. 2B shows 16 QAM in a complex plane;

PREFERRED EMBODIMENT OF THE INVENTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
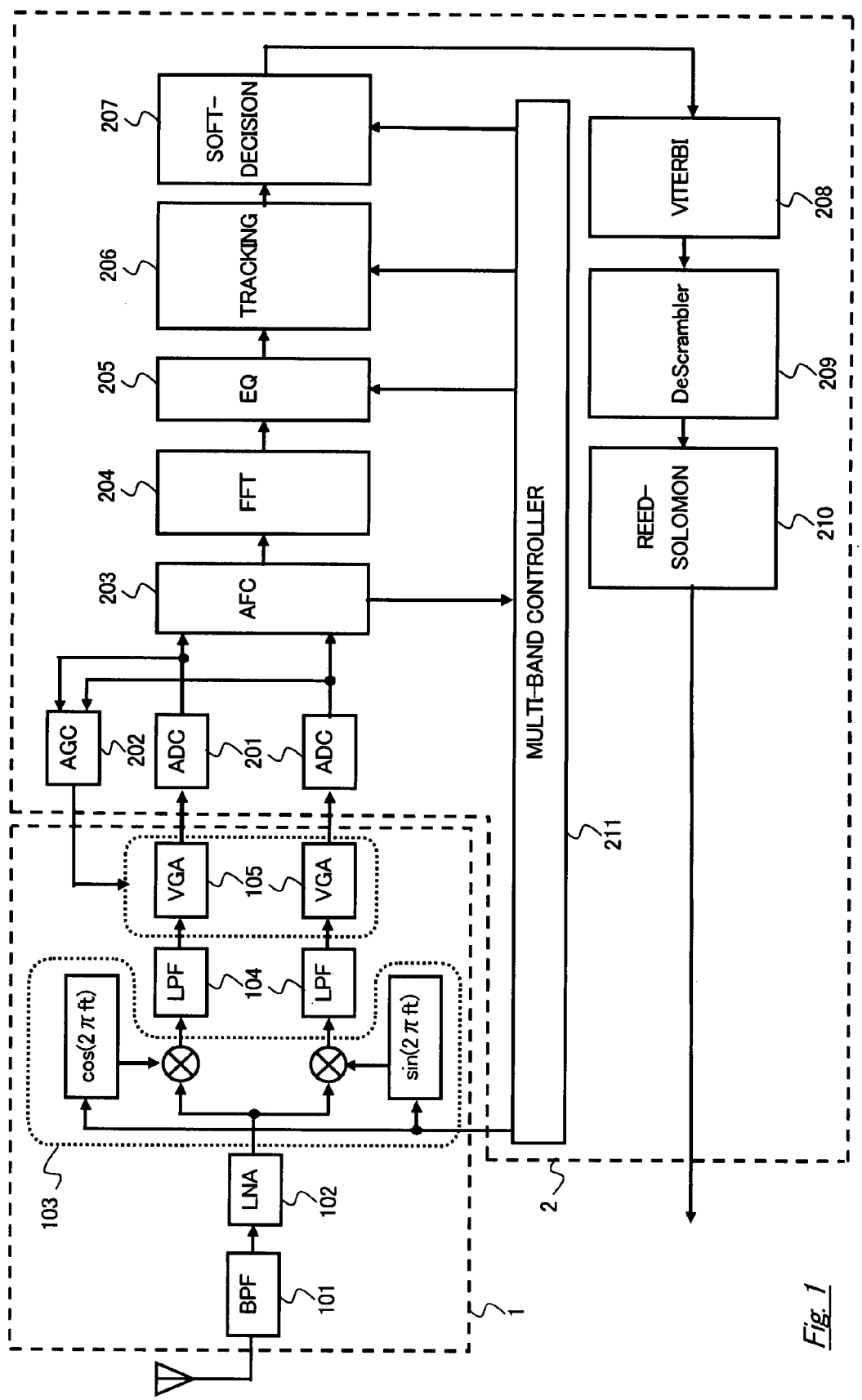
FIG. 1 shows a block diagram of a receiving apparatus based on an MB-OFDM method of the present invention.

Hereinafter, the preferred embodiment of the present invention is described with reference to drawings. An overview of an OFDM signal receiving apparatus of the present invention is described below. FIG. 1 shows a block diagram of a receiving apparatus based on MB-OFDM method of the present invention. As shown in FIG. 1, the receiving apparatus of the present embodiment have an RF unit 1 and a BB unit 2. The RF unit 1 demodulates a received radio signal and outputs a complex baseband signal (hereinafter, baseband signal). The BB unit 2 performs a digital baseband processing to a baseband signal output from the RF unit 1, and outputs received data which is transmitted by a transmitting apparatus.

The RF unit 1 of the present embodiment as a band pass filter (BPF) 101, a low noise amplifier (LNA) 102, an orthogonal demodulation circuit 103, a low pass filter (LPF) 104 and a variable gain amplifier (VGA) 105. The BB unit 2 has an A/D converter (ADC) 201, an automatic gain control circuit (AGC) 202, an automatic frequency control circuit (AFC) 203, A FAST Fourier transformation circuit (FFT) 204, an equalizer (EQ) 205, a tracking circuit (TRACKING) 206, a demodulation soft-decision circuit (SOFT-DECISION) 207, a Viterbi error correction circuit (VITERBI) 208, a descrambler 209, a Reed-Solomon error correction circuit (REED-SOLOMON) 210 and a multi-band controller 211.

The band pass filter 101 is a filter that passes a signal within a predetermined frequency band from a signal received by an antenna. The band pass filter 101 passes a signal that corresponds to MB-OFDM band through.

The low noise amplifier 102 amplifies the signal that passes through the band pass filter 101, and outputs an amplified signal. The low noise amplifier is disposed in order to amplify a received signal that is weak.

The orthogonal demodulation circuit 103 converts a received signal into a baseband signal. This conversion is performed by multiplying a received signal by sine and cosine waves that are correspond to main carrier wave. A received signal is separated into a real part and an imaginary part. The real part corresponds to an in-phase component (I channel) and an imaginary part corresponds to an orthogonal component (Q channel). A control signal output from a multi-band controller 211 is supplied to a unit which generates sine and cosine waves. A local oscillator which is used in orthogonal demodulation oscillates in a frequency based on the control signal. The control signal is determined based on the center frequency of the frequency band of the received OFDM signal. The center frequency is detected by the AFC circuit 203 which carries out a carrier sense operation.

The received signal is converted to the signal which has a frequency band of the baseband signal by the orthogonal demodulator. A received baseband signal which has a frequency band to demodulate received data passes through the low pass filter 104. The signal which passes through the low pass filter 104 is amplified by the variable gain amplifier 105 and input to the BB unit 2. In this operation, an amplification degree of the variable gain amplifier 105 is controlled by a control signal output by the AGC circuit 202.

The RF unit 1 converts the received signal to the baseband signal and The A/D converter 201 converts the analog baseband signal to the digital signal. The digital baseband signal converted by the A/D converter 202 is input to the AFC circuit 203. The output signal of the A/D converter 201 is also input to the AGC circuit 202. The AGC circuit 202 controls the gain of the variable gain amplifier 105 according to the electrical power of the received signal; thereby a dynamic range of the A/D converter 201 is used effectively.

The AFC circuit 203 performs carrier sense operation and corrects the frequency error between a receiving apparatus and a transmitting apparatus. The center frequency of the RF signal is estimated by synchronizing the timing (hopping synchronization) of the MB-OFDM signal in this carrier sense operation. Thereby, the frequency band of the received OFDM signal is detected by this carrier sense operation. The AFC circuit 203 outputs a signal which indicates a frequency hopping to the multi-band controller 211 based on the detected frequency band.

The signal after the carrier sense operation and the frequency error correction by the AFC circuit 203 is input to the Fourier transform circuit 204. A discrete Fourier transform is performed to the digital baseband signal in the Fourier transform circuit 204. The signal of time scale is converted to the signal of frequency scale of sub-carrier by this Fourier transform. The equalizer 205 corrects skew of the signal converted to the signal of frequency scale.

The frequency error that is not removed by the AFC circuit 203 and a phase distortion such as a phase noise because of the fluctuation of local frequencies of a receiving apparatus and a transmitting apparatus are adjusted in the tracking circuit 206. The adjusted signal is input to the demodulation soft-decision circuit 207.

The demodulation soft-decision circuit 207 performs de-mapping operation to the phase-adjusted and frequency-adjusted signal and make a soft-decision of the received digital signal. The Viterbi error correction circuit 208 interleaves the digital signal and a Viterbi error correction is performed. The error corrected signal using a Viterbi decoding is input to the descrambler 209. The descrambler 209 removes a scramble that is made in a transmitting apparatus. The Reed-Solomon error correction circuit 210 corrects error according to Reed-Solomon code and outputs the digital signal.

The multi-band controller 211 outputs a control signal which corresponds to the center frequency of the occupied frequency band by the received symbol to the orthogonal demodulation circuit 103, the equalizer 205, the tracking circuit 206 and the demodulation soft-decision circuit 207 based on the center frequency detected by the AFC circuit 203.

The present embodiment relates to a tracking circuit 206 of the above configured OFDM receiving circuit. Therefore, phase tracking in OFDM method is described below. As described above, a plurality of bit are transmitted by one sub-carrier in OFDM method. Therefore, sub-carrier modulation is performed in OFDM system. For example, multi-value QAM which represents a plurality of bits by phase and amplitude of a sub-carrier is used in sub-carrier modulation.

QPSK represents 2 bits by using 4 points that are different in phase with each other. This QPSK is shown in FIG. 2A by using a complex plane. In QPSK, as shown in FIG. 2A, the points corresponding to $\pi/4$, $3\pi/4$, $5\pi/4$ and $7\pi/4$ of the complex plane shows "00", "01", "10" and "11". In 16 QAM and 64 QAM, an amplitude factor is added in addition to the phase factor, and the one sub-carrier represents 4 bits or 6 bits of data (See FIG. 2B). In case that the phase of the received point which is received by a receiving apparatus is misaligned because of phase noise, the receiving apparatus may wrongly determine received data because data is represented by using phase. Therefore, the tracking circuit 206 calculates the phase rotation amount and correct phase in the receiving apparatus.

Figure 3:
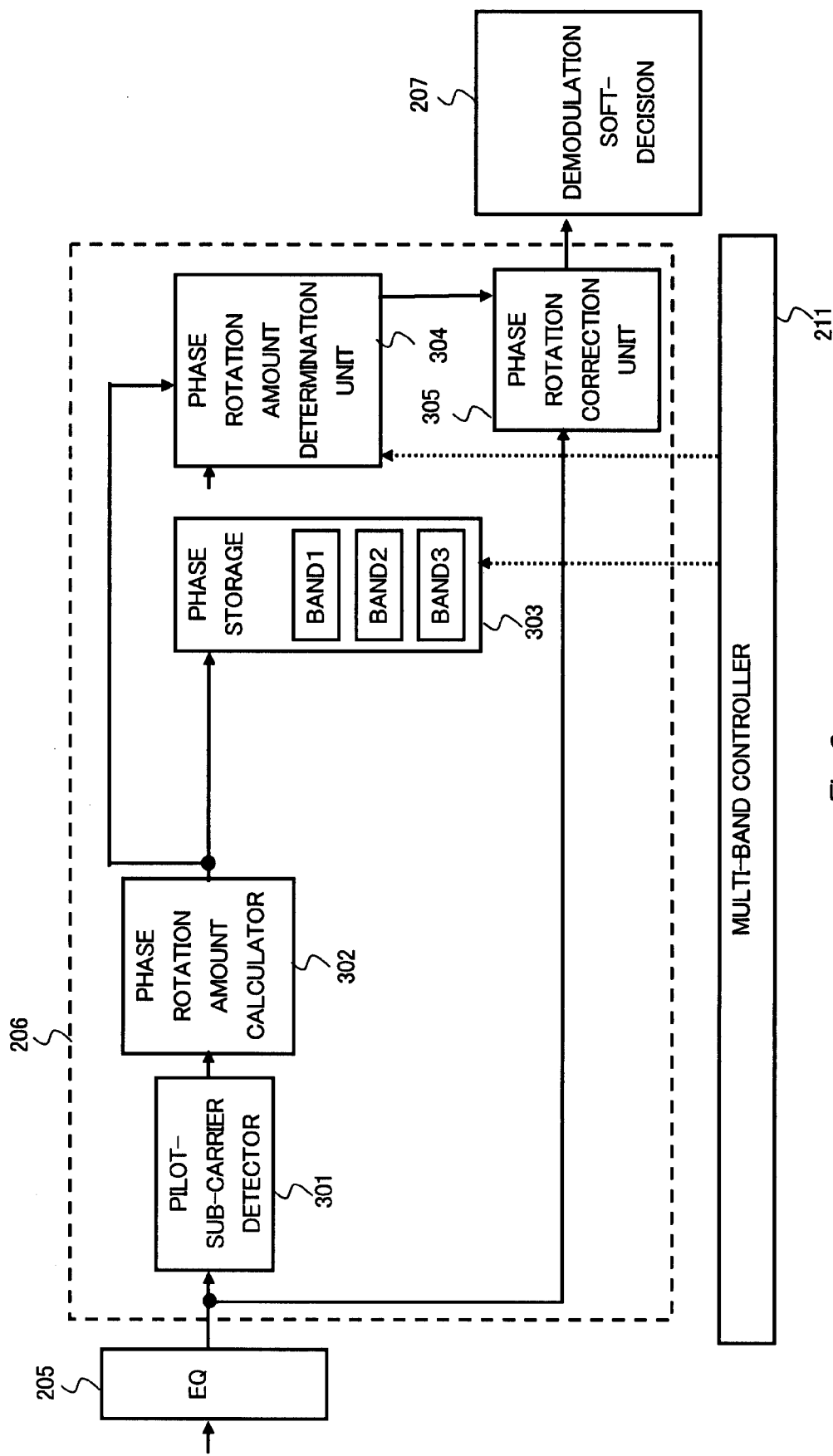
FIG. 3 shows a tracking circuit of the present embodiment.

FIG. 3 shows a tracking circuit of the present embodiment. The tracking circuit of the present embodiment has a pilot-sub-carrier detector 301, a phase rotation amount calculator 302, a phase storage 303, a phase rotation amount determination unit 304 and phase rotation correction unit 305.

The pilot-sub-carrier detector 301 detects a plurality of pilot-sub-carriers that correspond to pilot-sub-carriers included in the received signal (symbol). The phase rotation amount calculator 302 calculates a phase rotation amount of the received signal (symbol) according to pilot-sub-carriers included in the received symbol. A calculation result of the phase rotation amount calculator 302 is output to the phase storage 303 and the phase rotation amount determination unit 304.

The phase storage 303 stores the phase rotation amounts of each band, these phase rotation amounts are calculated by the phase rotation calculator 302. The phase rotation amount determination unit 304 determines a final phase rotation amount of the received symbol based on the calculation result of the phase rotation amount calculator 302 and phase rotation amounts stored in the phase storage 303, phase rotation amounts of the phase storage 303 correspond to frequency bands which are used in MB-OFDM. The phase rotation correction unit 305 rotates the signal which is output by the equalizer 205 based on the phase rotation amount determined by the phase rotation amount determination unit 304, and output the rotated signal to the demodulation soft-decision circuit 207. In the present embodiment, a phase rotation amount can be calculated using the phase rotation amount of the received latest symbol and the phase rotation amount of the symbol which is received before than the received latest symbol and occupying the same frequency band. According to the present invention, if a plurality of symbols are transmitted using different frequency bands due to frequency hopping, a plurality of symbols received at a same frequency band can be used in obtaining phase rotation amount. A variety of methods exist in order to smooth phase rotation amounts, in this embodiment, the phase rotation determination unit 304 smoothes phase rotation amounts using a plurality of symbols that are received at a same frequency band.

A smoothing of phase rotation amounts is generally carried out as described below. If the latest received symbol corresponds to nth symbol, the phase rotation amount of the same frequency band is three symbols before in the examinations shown in FIG. 7 and FIG. 12 ((n−3)th). This phase rotation amount is stored in the phase storage 303. In case that the phase rotation amount of the nth symbol is represented by $\Delta\theta(n)$ and the phase rotation amount of the (n−3) th symbol is represented by $\Delta\theta(n-3)$, the phase rotation amount $\Delta\theta\_dif(n)$ of one symbol can be calculated based on the difference between $\Delta\theta(n-3)$ and $\Delta\theta(n)$.

$$\Delta\theta\_dif(n)=\Delta\theta(n)-\Delta\theta(n-3)$$

Smoothing can be carried out by obtaining a moving average of calculated $\Delta\theta\_dif(n)$.

$$\Delta\theta\_dif\_ave=f\_ave\{\Delta\theta\_dif(n)\}$$

Herein, f_ave{ } means moving average function. An implementation of moving average function is variable, for example, a simple moving average method using simple moving average of several taps (number of average object) and an adaptive moving average method which changes number of taps dynamically are devised. However, description of moving average method is omitted herein.

Since obtained $\Delta\theta\_dif\_ave$ corresponds to phase rotation amount between one symbol and another symbol, the phase rotation amount $\Delta\theta\_correct$ of the nth received symbol can be represented below.

$$\Delta\theta\_correct=\Delta\theta\_dif\_ave*n$$

Therefore, the phase rotation amount $\Delta\theta\_correct$ of the nth received symbol can be obtained by multiplying $\Delta\theta\_dif\_ave$ by n.

In the present invention, the phase rotation amount determination unit 304 respectively smoothes phase rotation amounts by each band. As described above, variable methods can be applied to smoothing, and other methods except for described methods can be applied to smoothing. In order to realize the present invention, smoothing phase rotation amounts are respectively carried out by each frequency band.

Figure 4:
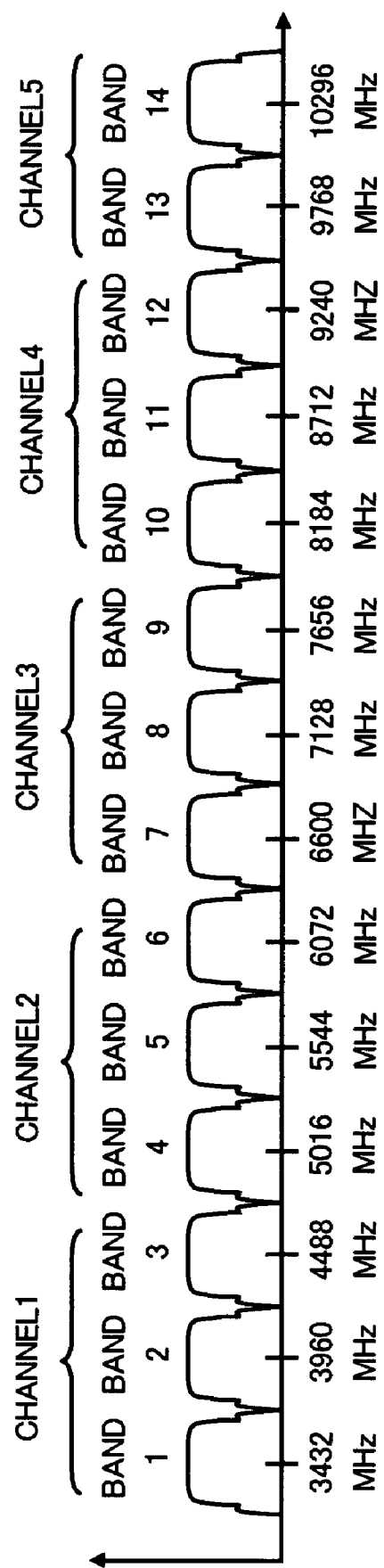
FIG. 4 shows frequency band of OFDM.

The operation of tracking circuit shown in FIG. 3 is described below. The pilot-sub-carrier detector 301 detects pilot-sub-carriers included in a received symbol. In MB-OFDM, for example, a band from 3.1 GHz to 10.6 GHz is divided into 14 bands and each divided band has a 528 MHz band width (See FIG. 4). 128 sub-carriers are assigned to each band and 12 sub carriers among 128 sub-carriers correspond to pilot sub carriers. One symbol corresponds to one divided band, therefore the pilot sub-carrier detector 301 detects 12 pilot sub-carriers when one symbol is received by the pilot sub-carrier detector 301.

Figure 5:
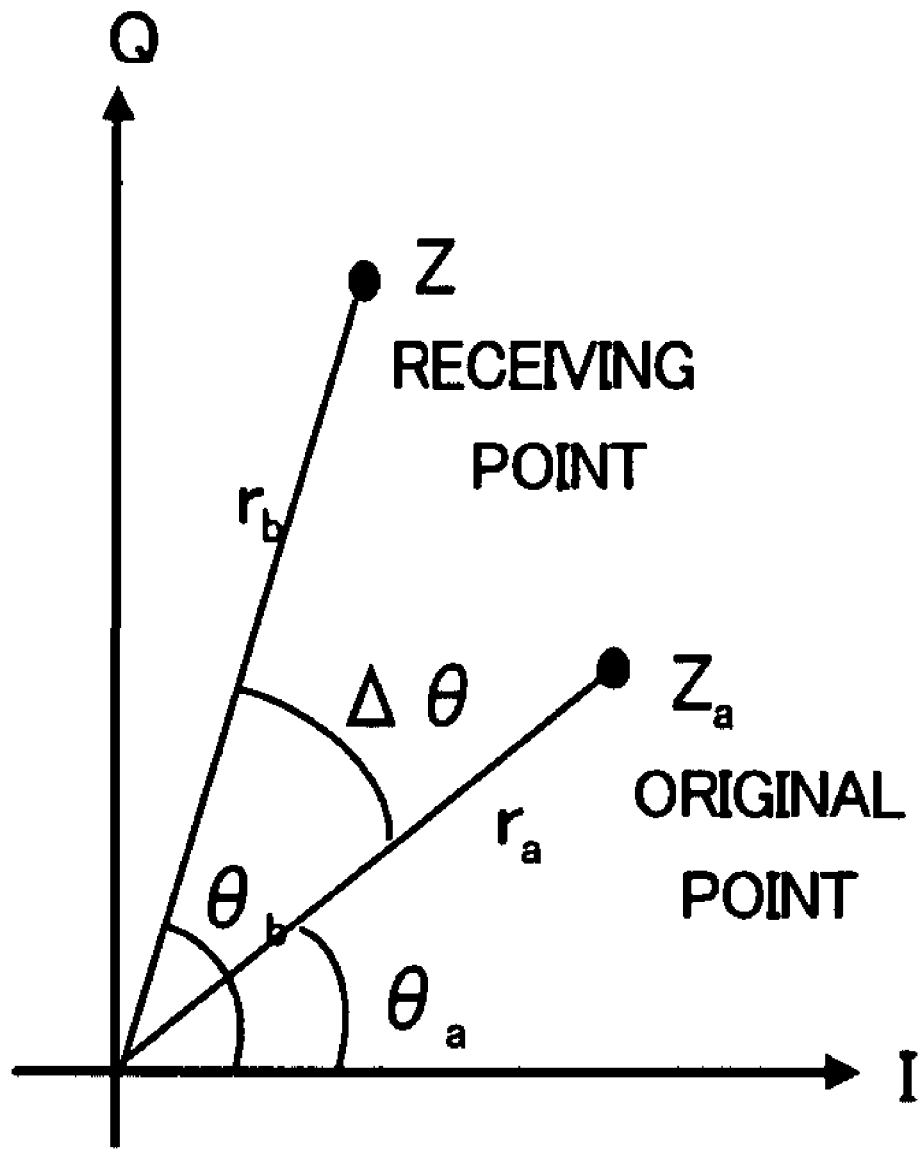
FIG. 5 is a drawing to describe this calculation of a phase rotation amount.

The phase rotation amount calculator 302 calculates a phase rotation amount according to pilot-sub-carriers included in OFDM signal of the received symbol. FIG. 5 is a drawing to describe this calculation of a phase rotation amount. Za of FIG. 5 shows an original signal point corresponding to one pilot sub-carrier. Zb of FIG. 5 shows a signal point corresponding to a received pilot sub-carrier. When a phase rotation amount $\Delta\theta$ shown in FIG. 5 is calculated, calculation described below is performed.

1) Original signal point is divided by received signal point in complex number and phase difference vector is obtained.

2) Arctangent is calculated based on the obtained phase difference vector and phase difference vector is converted to phase difference.

Herein, as shown in FIG. 5, Za is represented (Xa, Ya) in complex plane and Zb is represented (Xb, Yb) in complex plane. When Za is expressed by Za=(Xa, Ya)=Ra*(cos θa+j*sin θa) and Zb is expressed by Zb=(Xb, Yb)=Ra*(cos θb+j*sin θb), the formula 1 described below is true.

$$\frac{z_a}{z_b} = \frac{x_a + jy_a}{x_b + jy_b} = \frac{(x_a + jy_a)(x_b - jy_b)}{(x_b + jy_b)(x_b - jy_b)}$$

$$= \frac{1}{x_b^2 + y_b^2}\{(x_a x_b + y_a y_b) + j(y_a x_b - x_a y_b)\}$$

$$= \frac{1}{x_b^2 + y_b^2}\{(r_a \cos\theta_a r_b \cos\theta_b + r_a \sin\theta_a r_b \sin\theta_b) + j(r_a \sin\theta_a r_b \cos\theta_b - r_a \cos\theta_a r_b \sin\theta_b)\}$$

$$= \frac{1}{x_b^2 + y_b^2}\{r_a r_b(\cos\theta_a \cos\theta_b + \sin\theta_a \sin\theta_b) + jr_a r_b(\sin\theta_a \cos\theta_b - \cos\theta_a \sin\theta_b)\}$$

$$= \frac{r_a r_b}{x_b^2 + y_b^2}\{\cos(\theta_a - \theta_b) + j\sin(\theta_a - \theta_b)\}$$

$$= \frac{r_a r_b}{r_b^2 \cos^2\theta_b + r_b^2 \sin^2\theta_b}\{\cos(\theta_a - \theta_b) + j\sin(\theta_a - \theta_b)\}$$

$$= \frac{r_a r_b}{r_b^2} \cdot \frac{\{\cos(\theta_a - \theta_b) + j\sin(\theta_a - \theta_b)\}}{\cos^2\theta_b + \sin^2\theta_b}$$

$$= \frac{r_a}{r_b}\{\cos(\theta_a - \theta_b) + j\sin(\theta_a - \theta_b)\}$$

A phase rotation amount corresponding to one pilot sub-carrier can be obtained by converting a phase difference vector described above into a phase difference. As described above, one symbol occupying a predetermined band width includes a plurality of pilot-sub-carriers. Thereby, when number of pilot-sub-carriers is expressed by n and a phase difference vector of kth pilot-sub-carrier is expressed by $\Delta P_{h\_err}(k)$, a phase rotation amount $\Delta\theta_{ofdm}$ calculated by the phase rotation amount calculator 302 corresponds to formula 2 described below.

$$\Delta\theta_{ofdm} = \sum_{k=1}^{n} \Delta P_{h\_err}(k)$$

The phase storage 303 temporarily stores phase rotation amounts calculated by the phase rotation calculator 302. The phase storage has a plurality of storing portions, each of storing portion corresponds to a frequency band used in frequency hopping in MB-OFDM. A relationship between data stored by the phase storage 303 and data output by the phase storage 303 to the phase rotation amount calculator is described below.

Figure 6:
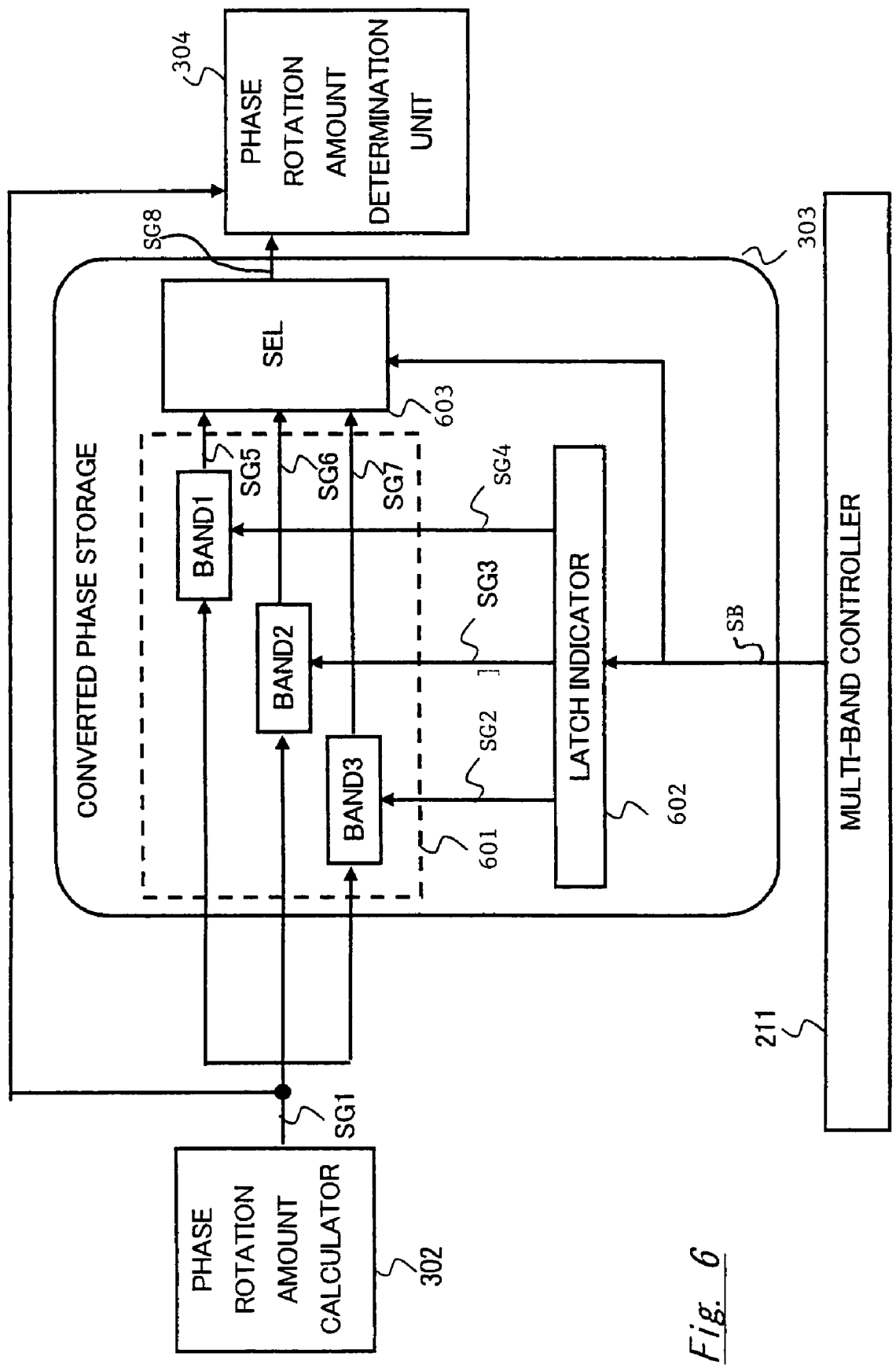
FIG. 6 shows the phase storage 303.

FIG. 6 shows the phase storage 303 in detail. The phase storage 303 has a phase memory 601, latch indicator 602 and selector 603.

The phase memory 601 fetches output of the phase rotation amount calculator 302 according to an indication of the latch indicator 602 and stores the output of the phase rotation amount calculator 302. The latch indicator 602 outputs an indication to the phase memory 601 based on the frequency band of the received symbol, therefore the indication shows what phase rotation amount the phase memory 601 has to store. The selector 603 selects a phase rotation amount to output from outputs of storing portions based on the frequency band of the received symbol. A received band signal SB is input to the latch indicator 602 and selector 603 by the multi-band controller 211.

Figure 7:
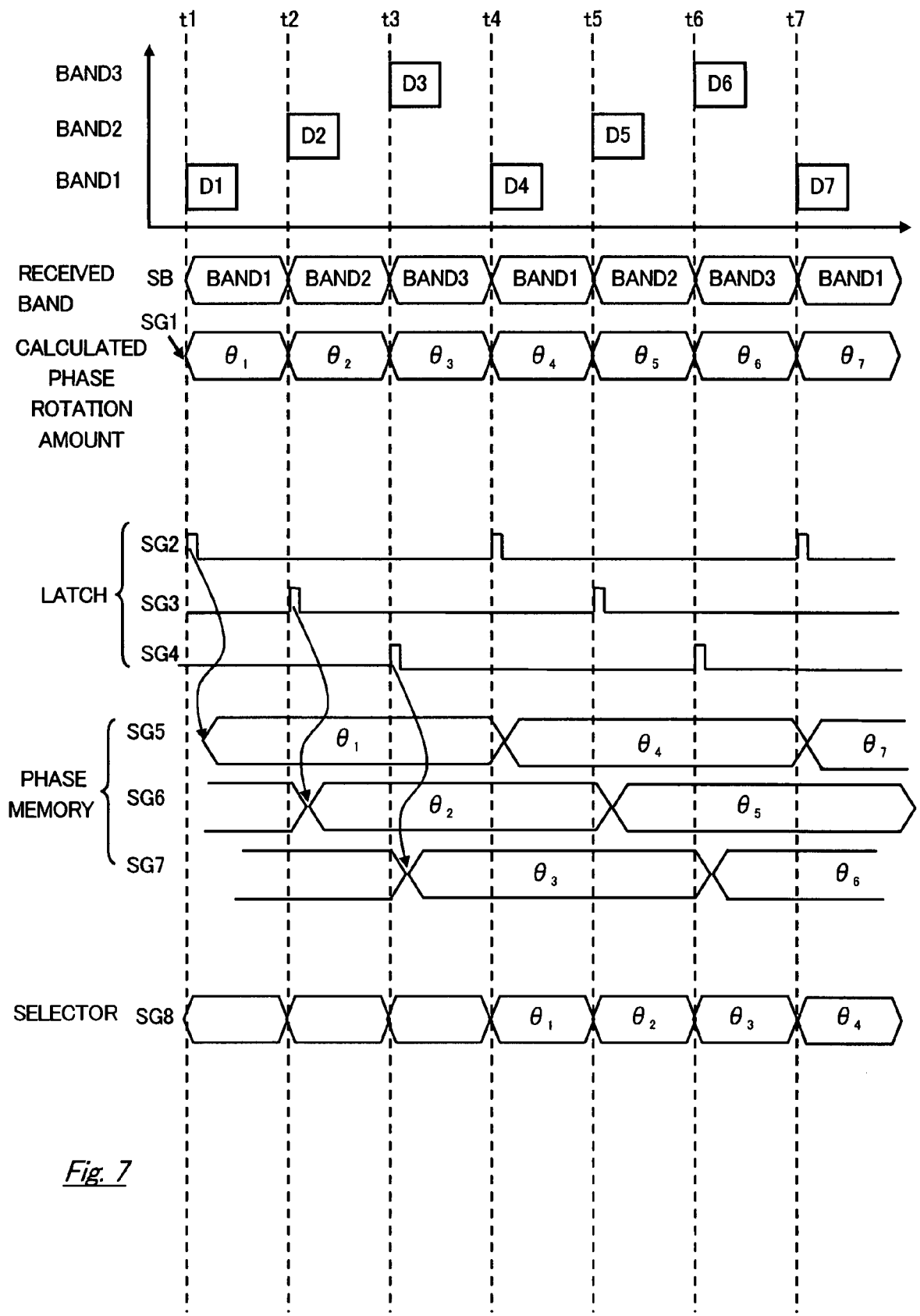
FIG. 7 shows signals when a plurality of symbols is received.

FIG. 7 shows signals when a plurality of symbols D1 to D7 is received. The above described operation is described below referring to FIG. 7. In FIG. 7, changes of frequency bands by frequency hopping are set such as BAND1 to BAND2, BAND2 to BAND3 and BAND3 to BAND1, and symbols D1 to D7 are received sequentially.

Symbol D1 which occupies frequency band BAND1 is input to the tracking circuit 206 at time t1 in FIG. 7. In tracking circuit 206, the phase rotation amount θ1 of symbol D1 is calculated by the pilot-sub-carrier detector 301 and the phase rotation amount calculator 302. This θ1 is input to the phase storage 303 (See FIGS. 6 and 7, SG1). The multi-band controller 211 outputs a received band signal SB which indicates that the received symbol D1 occupies frequency band BAND1 to the phase storage 303.

When the received signal indicates BAND1, the latch indicator 602 outputs a latch indication signal which indicates to overwrite a part of the phase memory 601. In this case, the part to be overwritten corresponds to a part which stores phase rotation amount about BAND1 (See FIGS. 6 and 7, SG4).

Then, symbol D2 is input to the tracking circuit 206 at time t2. As received band signal SB indicates that the received symbol D2 occupies frequency band BAND2, a part which stores the phase rotation amount of BAND2 is overwritten (See FIGS. 6 and 7, SG3). The same operations are repeated based on a frequency band signal of a received symbol as shown in FIG. 7. When the symbol D4 is input to the tracking circuit 206 at time t4, the phase memory 303 overwrite a storing portion which corresponds to BAND1, and outputs the phase rotation amount θ1 to the phase rotation amount calculator 302, the phase rotation amount θ1 corresponds to the stored data before overwriting (See FIGS. 6 and 7, SG2 and SG8). The selector 603 selects one output among three outputs from storing portions. Similarly, when symbol D5 is input, θ2 is output, and when symbol D6 is input, θ3 is output.

The phase rotation amount which is output by the phase rotation amount calculator 302 and corresponds to the latest received symbol, and the phase rotation amount which is output by the phase storage 303 and received at the same frequency band before are input to phase rotation amount determination unit 304. As shown in FIG. 7, θ4 is input by the phase rotation amount calculator 302 and θ1 is input by the phase storage 303 at time t4. The phase rotation amount determination unit 304 smoothes these inputs and determines the final phase rotation amount. That is, a plurality of symbols received at a same frequency band are used in obtaining phase rotation amount, even if a plurality of symbols are transmitted using different frequency bands due to frequency hopping. Two symbols are used to calculate a phase rotation amount in the present embodiment. One is a received latest symbol and the other is a symbol which is received before the latest symbol and occupying a same frequency range of the received latest symbol. The phase rotation amount determination unit 304 calculates a correction value based on the determined phase rotation amount and outputs the correction value to the phase rotation correction unit 305. A correction value is respectively calculated by a frequency band in the phase rotation amount determination unit 304. The phase rotation correction unit 305 corrects a phase distortion of the signal output by the equalizer 205 based on the correction value output by the phase rotation amount determination unit 304.

In the above described configuration, the phase storage 303 and the phase rotation amount determination unit 304 receive a control signal which is generated by the multi-band controller 211 and indicate the frequency band of the latest received symbol, because these components operate based on the frequency band of the latest received symbol.

Figure 8:
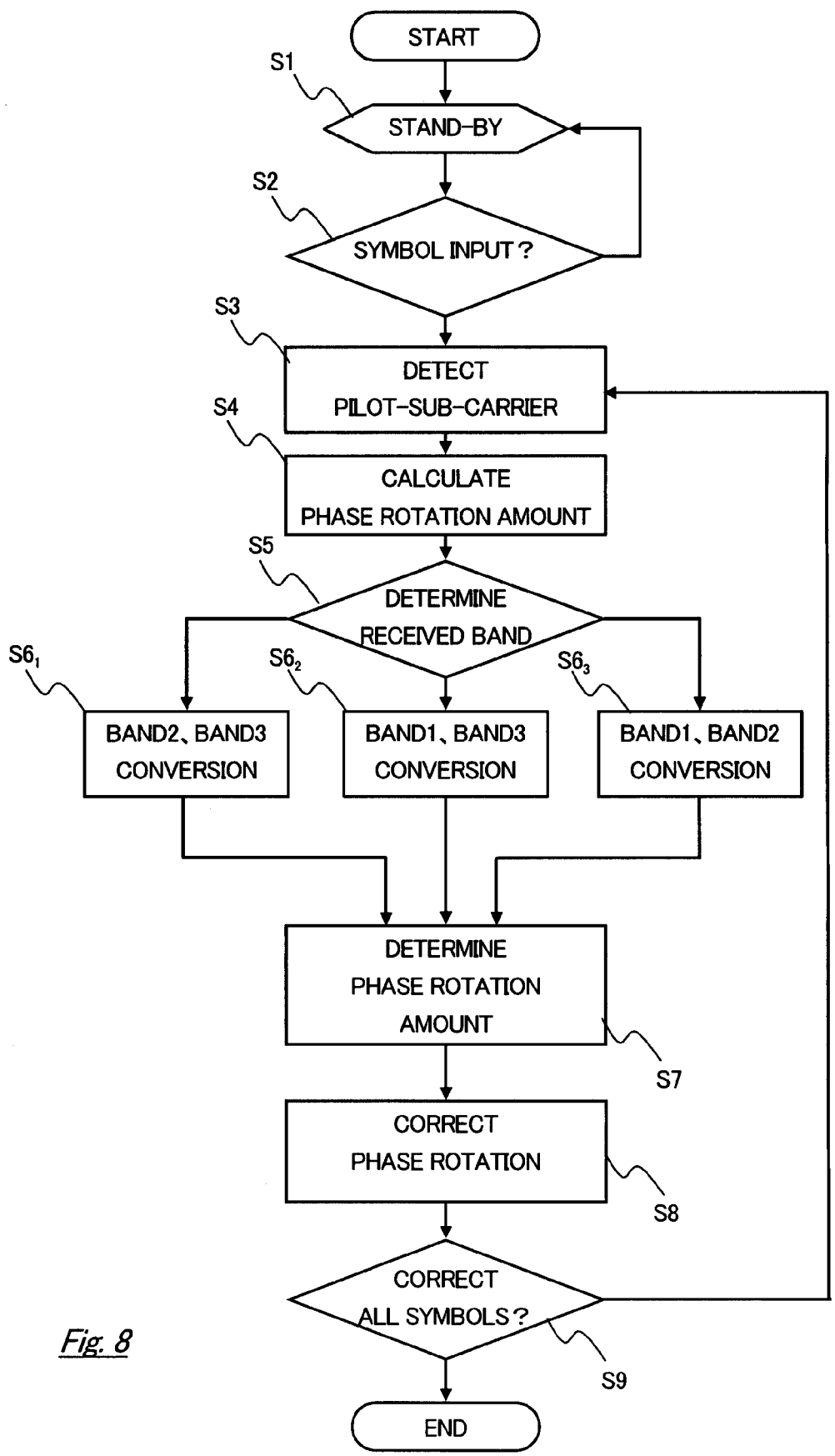
FIG. 8 is a flow chart showing the tracking method of the present invention.
Figure 9:
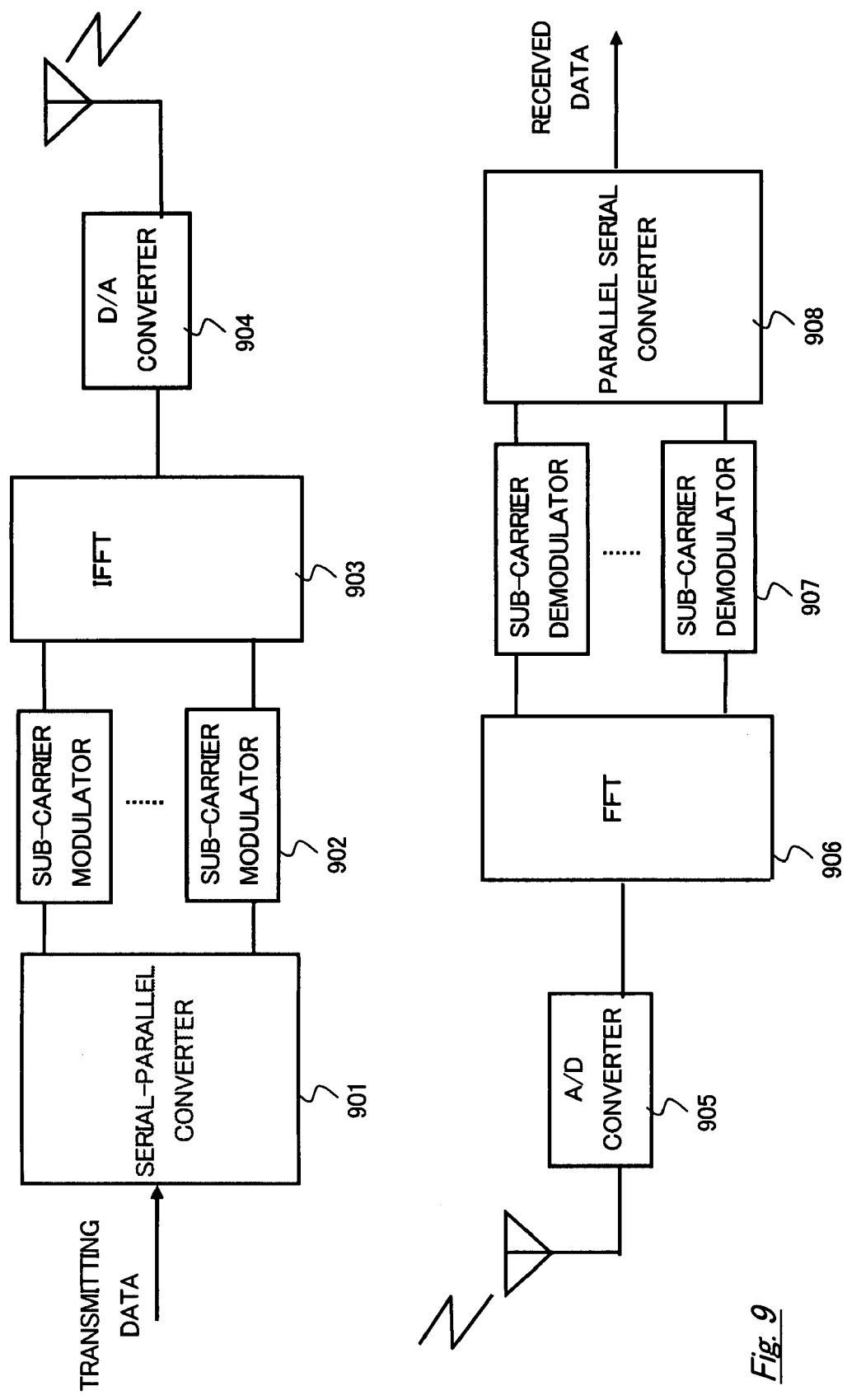
FIG. 9 shows a transmitting apparatus and a receiving apparatus which modulate or demodulates data in OFDM system.
Figure 10:
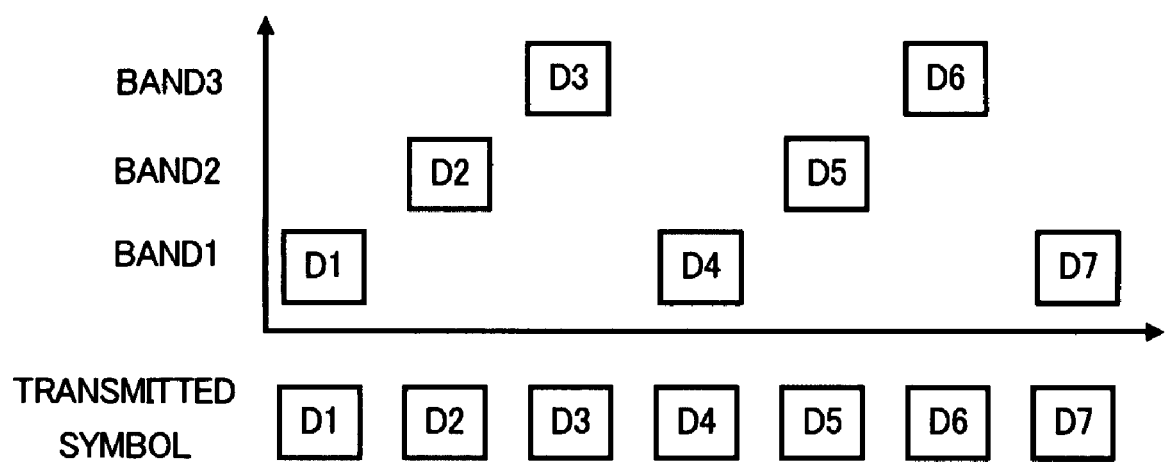
FIG. 10 shows transmitted symbols with frequency hopping.

A phase tracking method of the above described tracking circuit 206 is described below using a flow chart. FIG. 8 is a flow chart showing the tracking method carried out by the tracking circuit 206.

Step 1 to Step 3 (S1, S2, S3)

The tracking circuit 206 is in a stand-by state until a symbol to correct a phase rotation amount is input after a receiving circuit starts a receiving operation (See FIG. 8, S1 and S2). When a symbol to carry out a phase tracking is received and a signal processed by the FFT 204 and equalizer 205 is input to the phase tracking circuit 206, the pilot-sub-carrier detector 301 detects pilot-sub-carriers.

Step 4 (S4)

The phase rotation amount calculator 302 calculates the phase rotation amount of the received symbol based on the detected pilot-sub-carriers (See FIG. 8, S4). The calculated phase rotation amount is output to the phase storage 303 and the phase rotation amount determination unit 304.

Steps 5 and 6 (S5, S6)

The phase storage 303 determines a frequency band of the received symbol based on a control signal from the multi-band controller. A phase rotation amount calculated by the phase rotation amount calculator 302 is input to the phase storage 303. The input phase rotation amount is stored in a phase memory 601 corresponding to the received frequency band.

Step 7

The phase rotation amount determination unit 304 determines phase rotation amount based on two phase rotation amounts. One is a phase rotation amount of the received latest symbol and the other is a phase rotation amount which corresponds to a symbol which is received before the latest symbol and occupying a same frequency range of the received latest symbol. A symbol which is received before the latest symbol and occupying a same frequency range of the received latest symbol corresponds to the adjacent symbol at the same frequency. In the example shown in FIG. 7, the symbol three symbols ahead than the received symbol corresponds to this symbol. The phase rotation amount determination unit 304 calculates a correction value based on the determined phase rotation amount and outputs the correction value of the received symbol.

Steps 8 and 9 (S8, S9)

In the phase rotation correction unit 305, a phase correction of the received symbol is performed based on the correction value determined in S8 (See FIG. 8, S9). When the phase correction about all received symbols is finished, phase tracking operation ends. If symbol is input sequentially and phase correction of next symbol is not finished, tracking operation is back to S3 and processing is repeated (See FIG. 8, S10).

As described in detail, even if MB-OFDM which hops the frequency band by every symbol, it is able to calculate phase rotation amount of the received symbol and correct phase of the received symbol. Further, even if a noise corresponding to a certain band is strong because of jamming and soon, phase rotation amount of each band can be corrected properly.

The present invention is not limited to the embodiment, that can be modified. For example, the phase memory 601 shown in FIG. 6 has not to correspond to number of frequency bands, information to fetch and output can be switched based on change of the signal which indicates received frequency band.

It is apparent that the present invention is not limited to the above embodiment, that may be modified and changed without departing from the scope and spirit of the invention.

What is claimed is:

1. A receiver configured to receive information using a multi-carrier signal transmitted with frequency hopping in a first and a second frequency bands, the receiver comprising:
    a phase rotation amount calculator configured to calculate a first phase rotation amount of the multi-carrier signal according to a pilot-sub carrier included in a first symbol;
    a first storing unit configured to store the first phase rotation amount after the receiver receives the multi-carrier signal within the first frequency band;
    a second storing unit configured to store the first phase rotation amount after the receiver receives the multi-carrier signal within the second frequency band;
    the phase rotation amount calculator configured to calculate a second phase rotation amount of the multi-carrier signal according to a pilot-sub carrier included in a second symbol;
    a selector configured to output the first phase rotation amount stored in the first storing unit as an output data when the receiver receives the multi-carrier signal within the first frequency band and to output the first phase rotation amount stored in the second storing unit as the output data when the receiver receives the multi-carrier signal within the second frequency band; and
    a phase rotation amount determination unit configured to calculate a correction amount based on the second phase rotation amount and the output data.

* * * * *